US009483954B2

(12) United States Patent
York et al.

(10) Patent No.: US 9,483,954 B2
(45) Date of Patent: Nov. 1, 2016

(54) EDUCATIONAL NETWORK BASED INTERVENTION

(71) Applicant: Pearson Education, Inc., Upper Saddle River, NJ (US)

(72) Inventors: Sean A. York, San Diego, CA (US); Steven H. Hill, Centennial, CO (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 0 days.

(21) Appl. No.: 14/204,398

(22) Filed: Mar. 11, 2014

(65) Prior Publication Data

US 2014/0272911 A1   Sep. 18, 2014

Related U.S. Application Data

(60) Provisional application No. 61/778,296, filed on Mar. 12, 2013.

(51) Int. Cl.
*G09B 7/00* (2006.01)
*G09B 5/08* (2006.01)
*G09B 7/07* (2006.01)
*H04L 29/08* (2006.01)
*G06Q 50/20* (2012.01)

(52) U.S. Cl.
CPC . *G09B 5/08* (2013.01); *G09B 7/00* (2013.01); *G09B 7/07* (2013.01); *G06Q 50/20* (2013.01); *H04L 67/22* (2013.01); *H04L 67/306* (2013.01)

(58) Field of Classification Search
CPC ............ G09B 7/00; G09B 7/02; G09B 7/07; G09B 7/073; G09B 7/077; G06Q 50/01
USPC ................ 434/236, 322, 323, 350, 362, 365
See application file for complete search history.

(56) References Cited

U.S. PATENT DOCUMENTS

| 8,753,200 | B1  |     | 6/2014  | Supanc et al.              |
|-----------|-----|-----|---------|----------------------------|
| 2002/0142278 | A1 | *  | 10/2002 | Whitehurst et al. ......... 434/350 |
| 2004/0033475 | A1 | *  | 2/2004  | Mizuma et al. ............. 434/219 |
| 2004/0202991 | A1 |    | 10/2004 | Clark et al.               |
| 2008/0038705 | A1 | *  | 2/2008  | Kerns et al. ................. 434/309 |

(Continued)

OTHER PUBLICATIONS

International Search Report and Written Opinion mailed Jun. 4, 2014 for International Patent Application No. PCT/US2014/024877 filed Mar. 12, 2014, 20 pages.

(Continued)

*Primary Examiner* — Peter Egloff
(74) *Attorney, Agent, or Firm* — Kilpatrick Townsend & Stockton LLP

(57) ABSTRACT

Methods and systems for educational intervention are disclosed. The methods can include receiving a user response and analyzing the user response and other user data to determine a user typology. The user typology can be compared with risk data that indicates the user's risk of failing to achieve a target outcome based on the identified user typology. If the user's risk of failing to achieve the target outcome exceeds a desired level, a mitigation plan can be generated and provided to the user to thereby facilitate in the attainment of the target outcome.

8 Claims, 9 Drawing Sheets

(56) References Cited

U.S. PATENT DOCUMENTS

| | | | |
|---|---|---|---|
| 2008/0040370 A1 | 2/2008 | Bosworth et al. | |
| 2009/0075709 A1 | 3/2009 | Park | |
| 2010/0070510 A1 | 3/2010 | Agarwal et al. | |
| 2010/0159438 A1* | 6/2010 | German et al. | 434/433 |
| 2011/0117534 A1* | 5/2011 | Berger et al. | 434/350 |
| 2012/0040326 A1* | 2/2012 | Larson-Rutter et al. | 434/350 |
| 2012/0078653 A1 | 3/2012 | Sachs et al. | |
| 2012/0244505 A1* | 9/2012 | Lang et al. | 434/322 |
| 2012/0303635 A1 | 11/2012 | Summers | |
| 2014/0295957 A1 | 10/2014 | Supanc et al. | |
| 2014/0308650 A1 | 10/2014 | Loring et al. | |

OTHER PUBLICATIONS

First Action Interview Pilot Program Pre-Interview Communication mailed on Sep. 26, 2014 for U.S. Appl. No. 14/252,402, 20 pages.

Non-Final Office Action mailed on Sep. 4, 2014 for U.S. Appl. No. 14/305,478, 7 pages.

Notice of Allowance mailed on Nov. 18, 2014 for U.S. Appl. No. 14/305,478, 7 pages.

Notice of Allowance mailed on Feb. 7, 2014 for U.S. Appl. No. 14/103,576, 8 pages.

International Preliminary Report on Patentability issued Sep. 15, 2015 for International Patent Application No. PCT/US2014/024877 filed Mar. 12, 2014, 8 pages.

* cited by examiner

EDUCATIONAL NETWORK BASED INTERVENTION

CROSS-REFERENCES TO RELATED APPLICATIONS

This application claims the benefit of U.S. Provisional Application No. 61/778,296, filed on Mar. 12, 2013, and entitled "Educational Network Based Intervention," the entirety of which is hereby incorporated by reference herein.

BACKGROUND OF THE INVENTION

This disclosure relates in general to learning and can include traditional classroom learning or on-line or computerized learning including, but without limitation, learning or instruction with a Learning Management System (LMS) and/or Online Homework System (OHS).

Guidance counselors work with students to help the students achieve goals. These goals can include academic and/or life goals. While guidance counselors are able to benefit students, they rely on their own experiences as well as common sense to assist students. While this assistance can be useful, many times it is irrelevant to the student, and in some cases, the student no longer seeks the assistance of the guidance counselor. Thus, better systems, methods, and devices are required to assist in the attainment of goals.

BRIEF SUMMARY OF THE INVENTION

In one embodiment, the present disclosure relates to a method for social network-based educational intervention. In some embodiments, the method includes receiving a subject prompt that includes information relating to a topic, receiving target group information that identifies intended recipients of the subject prompt, and receiving a response from a member of the target group, which response is related to the subject prompt. In some embodiments, the method includes receiving member information that identifies attributes of the member of the target group. These attributes can include information relating to the member's past responses and information relating to the member's past outcomes; identifying a typology of the member, which typology is based on the member information and the received response; and identifying a member outcome that is an identified goal. In some embodiments, the method includes determining whether the identified typology positively correlates to achievement of the member outcome and requesting an intervention when the identified typology does not positively correlate to achievement of the member outcome.

In some embodiments of the method for social network-based educational intervention the typology of the member identifies a trait of the member. In some embodiments of the method, identifying the typology of the member includes determining a characteristic of the received response. In some embodiments, identifying the typology of the member includes generating a composite response score that is one or several values indicative of one or several attributes of the response. In some embodiments, the attributes of the response include at least one of: the content of the response, the style of the response, and the timing of the response.

In some embodiments of the method for social network-based educational intervention identifying the typology of the member includes retrieving classification data. In some embodiments, the classification data correlates one or several composite response scores with one or several typologies. In some embodiments of the method, identifying the typology of the member includes comparing the response score to the classification data to determine the typology of the member. In some embodiments of the method, determining whether the identified typology positively correlates to achievement of the user outcome includes calculating a risk score indicative of the risk that the member fails to achieve the member outcome, and in some embodiments, the method includes comparing the risk score to a risk threshold. In some embodiments of the method, requesting an intervention includes generating a mitigation plan including steps to increase the likelihood of member attainment of the member outcome.

In one embodiment, the present disclosure relates to a system for social network-based educational intervention. In some embodiments, the system includes memory storing target group information that identifies intended recipients of a subject prompt and member information identifying attributes of the member of the target group, wherein the attributes include information relating to the member's past responses and information relating to the member's past outcomes; and a processor. In some embodiments, the processor can receive a subject prompt that includes information relating to a topic; receive the target group information; receive a response from a member of the target group, which response is related to the subject prompt; and receive the member information. In some embodiments, the processor can identify a typology of the member, which typology is based on the member information and the received response, identify a member outcome that is an identified goal, and determine whether the identified typology positively correlates to achievement of the member outcome. In some embodiments, the processor can request an intervention when the identified typology does not positively correlate to achievement of the member outcome.

In some embodiments, the typology of the member identifies a trait of the member, and in some embodiments, identifying the typology of the member includes determining a characteristic of the received response. In some embodiments identifying the typology of the member includes generating a composite response score that can be one or several values indicative of one or several attributes of the response. In some embodiments, the attributes of the response include at least one of: the response content; the response style; and the response timing.

In some embodiments, identifying the typology of the member includes retrieving classification data. In some embodiments, the classification data correlates one or several composite response scores with one or several typologies. In some embodiments, identifying the typology of the member includes comparing the response score to the classification data to determine the typology of the member. In some embodiments, determining whether the identified typology positively correlates to achievement of the user outcome includes calculating a risk score indicative of the risk that the member fails to achieve the member outcome. In some embodiments, requesting an intervention includes generating a mitigation plan having steps to increase the likelihood of member attainment of the member outcome.

In one embodiment, the present disclosure relates to a method for correlating a typology to an outcome. The method includes identifying a target outcome, which target outcome is a goal, receiving user data, which user data includes information generated from user interaction via a social network and past outcomes associated with those interactions; and identifying a subset of users within the user data that are relevant to the target outcome. In some embodiments, the subset of users share a common typology, which typology is based on information relating to the user's interaction via the social network and past user outcomes. In some embodiments, the method includes adding an indicator to the user data associated with the subset of users relevant to the target outcome, determining a correlation between the identified typology and the target outcome, which correlation indicates whether the typology positively or negatively correlates with the achievement of the target outcome, and associating an indicator of the degree of correlation between the identified typology and the target outcome with the identified typology.

In some embodiments of the method, the subset of users exhibits the same typology and the same degree of that typology, and in some embodiments, the method includes generating an outcome achievement value. In some embodiments, the outcome achievement value indicates whether the user achieved the target outcome.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
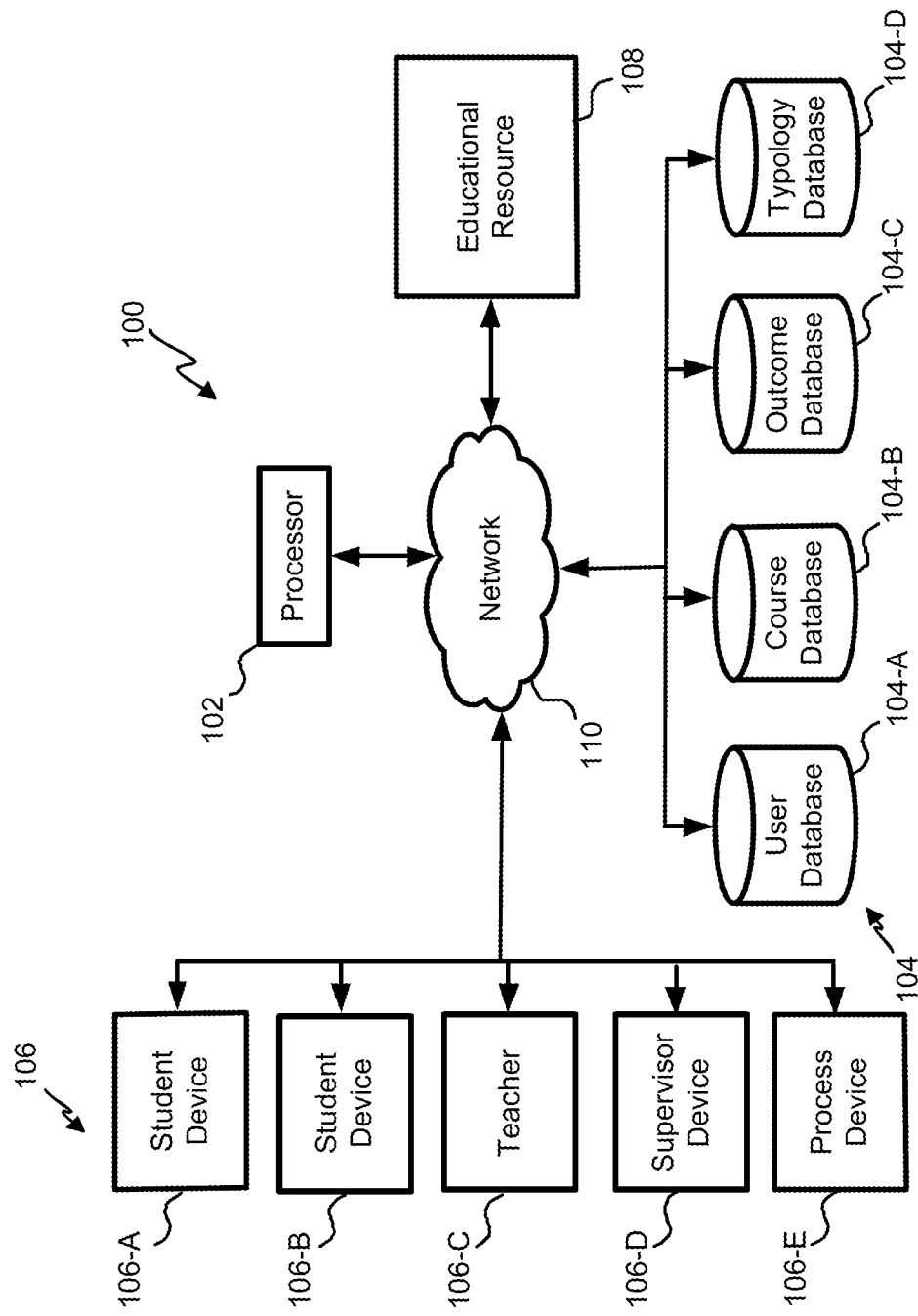
FIG. 1 is a schematic illustration of one embodiment of an educational network-based intervention system.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides an educational network-based intervention network-based intervention system. The educational network-based intervention network-based intervention system can include, for example, one or several user devices, a processor, an educational resource, and one or several databases. These components of the educational network-based intervention network-based intervention system can be communicatingly linked, for example, via a network. The educational network-based intervention network-based intervention system can collect user data and identify users that are at risk of failing to achieve a target outcome based on the collected user data. The educational network-based intervention network-based intervention system can further use collected user data to identify one or several user attributes and determine the correlation between these one or several user attributes and a specified outcome.

In one embodiment, the present disclosure provides a method for educational network based intervention. This method can include, for example, creating and/or collecting user data based on actions of a user within the educational network-based intervention network-based intervention system, and using this user data to determine a typology of the user. In some embodiments, the typology of the user can be used to determine the likelihood of the user achieving a target outcome. This likelihood can be used to trigger an intervention when the likelihood meets, exceeds, or fails to meet an intervention criterion. In some embodiments, for example, an intervention can be triggered based on the comparison of the likelihood to the intervention criteria.

In one embodiment, the present disclosure provides a method for linking a typology to an outcome. This method can include, for example, identifying a target outcome and identifying a subset of users having user data relevant to the target outcome. The success of the users, within the subset of users, at achieving the target outcome can be determined and a value indicative of the success of the users can be added to the user data. The subset of users can be analyzed to identify a typology of one or several of the users within the subset of users. A correlation can then be established between the typology and the target outcome based on the value indicative of the success of the user at achieving the target outcome for each user having a selected typology.

With reference now to FIG. 1, a block diagram of one embodiment of an educational network-based intervention network-based intervention system 100 is shown. The educational network-based intervention network-based intervention system 100 collects, receives, and stores data for one or several users of the system. In some embodiments, for example, the educational network-based intervention network-based intervention system 100 can determine whether an intervention is required based on the likelihood that a user will achieve a target outcome.

The educational network-based intervention network-based intervention system 100 can include a processor 102. The processor 102 can provide instructions to and receive information from the other components of the educational network-based intervention network-based intervention system 100. The processor 102 can act according to stored instructions, which stored instructions can be located in memory, associated with the processor, and/or in other components of the educational network-based intervention system 100. The processor can, in accordance with stored instructions, make decisions. The processor 102 can comprise a microprocessor, such as a microprocessor from Intel® or Advanced Micro Devices, Inc.®, or the like.

The educational network-based intervention system 100 can include one or several databases 104. The one or several databases 104 can comprise stored data relevant to the functions of the educational network-based intervention system 100. The one or several databases 104 can include a user database 104-A. The user database 104-A can include user data for one or several users of the educational network-based intervention system 100. This user data can include any information relating to the user. This information can, for example, identify the user, provide educational history of the user including, for example, one or several past, current, and/or scheduled courses of study, one or several past and/or current grades, one or several past and/or current educators including, for example, one or several teachers, user personality information, user ability and/or disability information, interaction information including, for example, when and how the user interacts with other individuals and/or users, user communications, user relationships including, for example, friendships, teacher-student relationships, and/or peer-tutor relationships, and the attributes of types of these relationships, and/or user demographic information including, for example, age, race, socioeconomic background, family status, and/or location. In some embodiments, for example, the user data can be collected and/or generated by the educational network-based intervention system 100, and in some embodiments, the user data can be input into the educational network-based intervention system 100.

In some embodiments, for example, the user database 104-A can comprise login information. This information can include, for example, information identifying a user such as, for example, a username and/or password, a codename, or a user identification number. In some embodiments, for example, when a user desires to access the educational network-based intervention system 100, the user can be prompted to enter identification information such as, for example, a username and password. After the user provides the identification information, the educational network-based intervention system 100 can verify the identification information, and specifically, the processor 102 can compare the user provided identification information to information stored within the user database 104-A to determine if the user is an authorized user.

In some embodiments, the user database 104-A can include response data. In some embodiments, the response data can include information relating to one or several actions taken by the user including, for example, responses or comments by the user. In some embodiments, the response data can store the response, store information relating to the response such as, for example, information indicating the substance, style, nature, and/or timing of the response, or the like. In some embodiments, the response data can further include one or several values indicating the results of one or several evaluations of the response data. In some embodiments, one of these values can include, for example, a composite response score that will be discussed in greater detail below.

The one or several databases 104 can include a course database 104-B. The course database 104-B can include information relating to a course of study, a group of courses, or a program that can include, for example, the collection of courses making up a degree, a grade, or the like. This information can include, for example, educational material, user performance indicator data such as, for example, grade data for users participating in the course of study, or data identifying the users participating in the course of study.

In some embodiments, the course database 104-B can further include information on groups which can be formal and/or informal, or communities. In some embodiments, these groups and/or communities can exist within a course, a group of courses, and/or a program or course of study, and in some embodiments, these groups and/or communities can exist across courses, groups of courses, and/or across programs or courses of study, and can be related and/or unrelated to a course, a group of courses, and/or a program or course of study. Advantageously, the groups and/or communities can facilitate education by encouraging the transfer of ideas between individuals.

In some embodiments, the course database 104-B can further include educational activities and information regarding the design of educational activities. Advantageously, the inclusion of education activities and information regarding the design of educational activities can facilitate the generation of understanding of the student-teacher relationship and/or interactions and can be used, for example, to compare and/or predict outcomes.

The educational network-based intervention system 100 can include an outcome database 104-C. The outcome database 104-C can include information relating to one or several outcomes. This information can include, for example, the identification of one or several outcomes, and/or relationships between the one or several outcomes. The outcome information can be input into the educational network-based intervention system 100 via one or several users and/or can be imported from another system associated with the education network-based intervention system 100.

The educational network-based intervention system 100 can include a typology database 104-D. The typology database 104-D can include information relating to one or several typologies. This information can include, for example, data identifying characteristics of the typology, criteria for the typology, behaviors associated with the typology, other related typologies, and/or outcomes associated with the typology. In some embodiments, for example, the typology database 104-D can include criteria, also referred to herein as classification data, for use in analyzing user data to determine the user's typology. In some embodiments, for example, these criteria can allow the binary classification of the user's typology, or the indication of the degree of the user's demonstration of the typology. Thus, these criteria can be used to classify the user as exhibiting the typology and/or to indicate the degree to which the user exhibits the typology.

The educational network-based intervention system 100 can include one or several user devices 106, which can include a first student device 106-A, a second student device 106-B, a teacher device 106-C, a supervisor device 106-D, and/or a process device 106-E. The user devices 106 allow a user, including a student, a teacher, a supervisor/analyst including, for example, an administrator and/or parent, and/or a process analyst including, for example, a researcher, observer, social scientist, or data scientist, to access the educational network-based intervention system 100. The details and function of the user devices 106 will be discussed at greater length in reference to FIG. 2 below.

The evaluation and optimization system 100 can include an educational resource 108. The educational resource 108 can be the source of the academic task and/or can be the source of some or all of the user profile data. Thus, in some embodiments, information such as, for example, the user's past academic performance including courses of study and/or academic tasks that the user has completed, and the user's performance in those completed courses of study and/or academic tasks. These tasks can include, for example, tasks that do not request student input such as an article, a video, or other instructional information, and/or tasks that request student input such as a structured learning activity, one or several questions, an activity assigning roles and responsibility, or any activity resulting in student generated work product. In some embodiments, the educational resource 108 can comprise a database of one or more courses of study and/or one or more academic tasks. In some embodiments, for example, the educational resource can be a university, a school, an institution of learning, and/or a learning management system (LMS).

The educational network-based intervention system 100 can include a network 110. The network 110 allows communication between the components of the educational network-based intervention system 100. The network 110 can be, for example, a local area network (LAN), a wide area network (WAN), a wired network, wireless network, a telephone network such as, for example, a cellphone network, the Internet, the World Wide Web, or any other desired network. In some embodiments, the network 110 can use any desired communication and/or network protocols.

Figure 2:
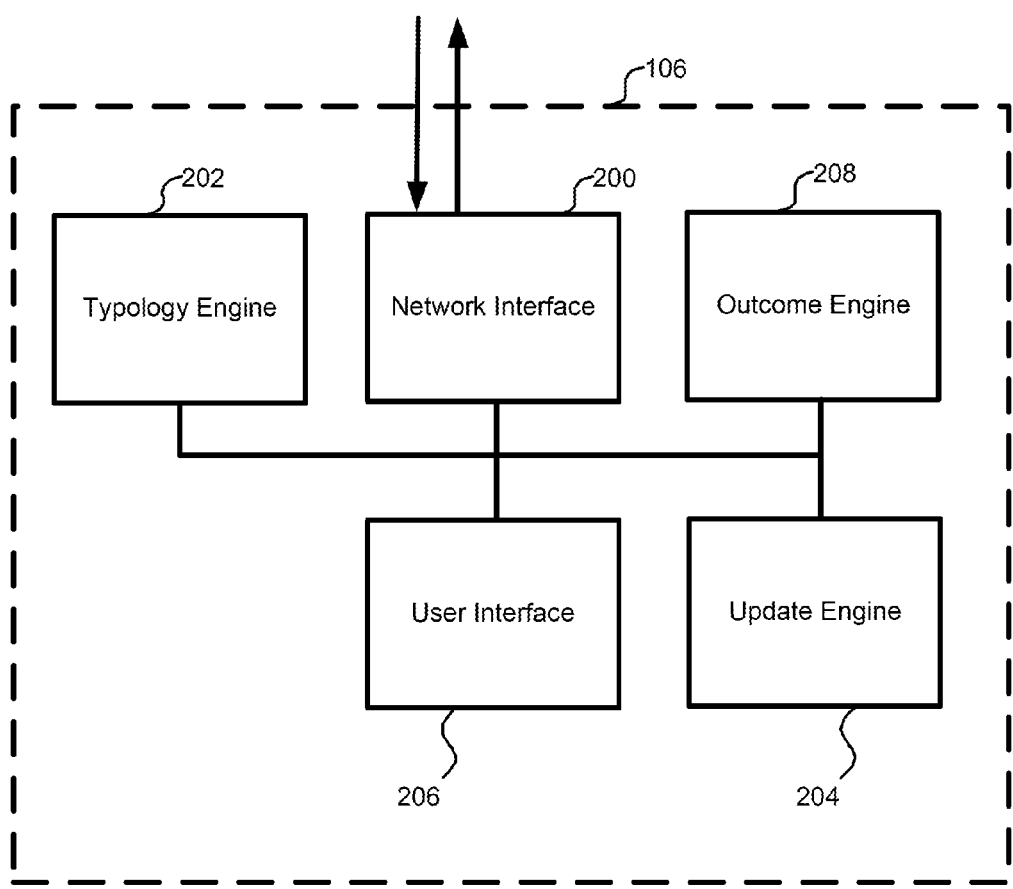
FIG. 2 is a schematic illustration of one embodiment of a user device for use with an educational network-based intervention network-based intervention system.

With reference now to FIG. 2, a block diagram of one embodiment of a user device 106 is shown. As discussed above, the user device 106 can be configured to provide information to and/or receive information from other components of the educational network-based intervention system 100. The user device can access the educational network-based intervention system 100 through any desired means or technology, including, for example, a webpage such as, for example, a social network service page, or a web portal. As depicted in FIG. 2, the user device 106 can include a network interface 200. The network interface 200 allows the user device 106 to access the other components of the educational network-based intervention system 100, and specifically allows the user device 106 to access the network 110 of the educational network-based intervention system 100. The network interface 200 can include features configured to send and receive information, including, for example, an antenna, a modem, a transmitter, receiver, or any other feature that can send and receive information. The network interface 120 can communicate via telephone, cable, fiber-optic, or any other wired communication network. In some embodiments, the network interface 200 can communicate via cellular networks, WLAN networks, or any other wireless network.

The user device 106 can include, for example, a typology engine 202. The typology engine 202 can identify and/or facilitate in identifying a user's typology. In some embodiments, for example, the typology engine 202 can cooperate with other components of the educational network-based intervention system 100 to identify and/or facilitate in identifying the typology of the user. In one embodiment, for example, the typology engine 202 can receive user data and typology data and evaluate the user data to determine the typology of the user.

The user device 106 can include an update engine 204. The update engine 204 can facilitate in updating any information within the educational network-based intervention system 100. In some embodiments, for example, the update engine 204 can facilitate a user such as, for example, a student in providing user data and/or outcome data, or a user such as, for example, a teacher providing course data. In some embodiments, the update engine 204 can be configured to update the user database 104-A with information relating to the interactions between users of the educational network-based intervention system 100, including, for example, user relationships.

The user device 106 can include a user interface 206 that communicates information to, and receives inputs from, a user. The user interface 206 can include a screen, a speaker, a monitor, a keyboard, a microphone, a mouse, a touchpad, a keypad, a touchscreen, or any other feature or features that can receive inputs from a user and provide information to a user.

The user device 106 can include an outcome engine 208. The outcome engine 208 can be configured to receive outcome data from the outcome database 104-C and determine the correlation between the outcome and the typology. In some embodiments, for example, this determination can include retrieving user data from the user database 104-A, determining a subset of users corresponding to the outcome, determining the degree to which the users in the subset of users achieve the outcome, determining the typology of the users within the subset of users, and correlating the typology to the outcome based on the degree to which the users achieve the outcome.

Figure 3:
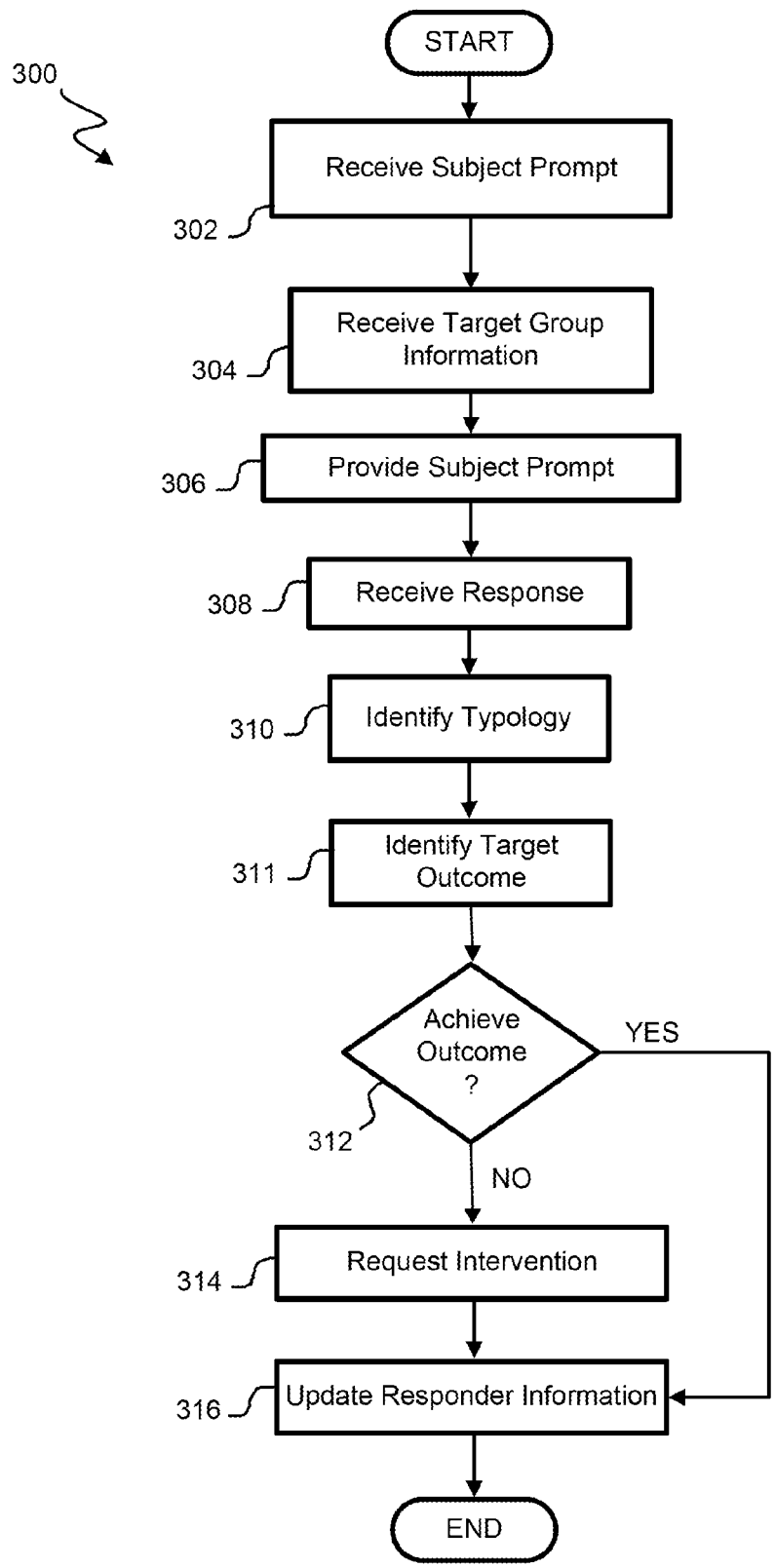
FIG. 3 is a flowchart illustrating one embodiment of a process for educational network based intervention.

With reference now to FIG. 3, a flowchart illustrating a process 300 for educational network-based intervention is provided. The process 300 can be performed by one or several of the components of the educational network-based intervention system 100. The process 300 begins at block 302 wherein a subject prompt is received. In some embodiments, for example, the subject prompt can include data relating to a course of study. This data can include, for example, a question, a comment, or a quote. In some embodiments, for example, this prompt can be provided by a user such as a student and/or a teacher. This prompt can be received by the user device 106 including, for example, the student device 106-A, 106-B, the teacher device 106-C, and/or the supervisor device 106-D.

After the subject prompt has been received, the process 300 proceeds to block 304 wherein target group information is received. In some embodiments, for example, target group information can include information identifying the one or several designated recipient users of the subject prompt. In some embodiments, for example, the target group can comprise all, or a subset of, the users associated with a course of study such as, for example, the one or several students and/or teachers involved in the course of study. In some embodiments, for example, the target group information can be received from one or several of the databases 104 including, for example, the user database 104-A and/or the course database 104-B. In some embodiments, the target group information can be received by a component of the educational network-based intervention system 100 such as, for example one or several of the user devices 106 and/or the processor 102.

After the target group information has been received, the process 300 proceeds to block 306 wherein the subject prompt is provided. In some embodiments, for example, the subject prompt received in block 302 can be stored in one or several of the databases 104 such as, for example, the user database 104-A and/or the course database 104-B, and can be provided to one or several of the users via one or several of the user devices 106. In some embodiments, the subject prompt can be provided to the users in the target group.

After the subject prompt has been provided, the process 300 proceeds to block 308 wherein a response is received. The response can be any user-generated content, and in one embodiment, the response can be, for example, a reaction to the subject prompt. The response can be provided by a user that can be in the target group such as, for example, a student. The response can include, for example, a comment, question, a quote, a link, or any other data. In some embodiments, the response can be input into one or several of the user devices 106 such as, for example, one or several of the student devices 106-A, 106-B.

After the response has been received, the process 300 proceeds to block 310 wherein a typology is identified. In some embodiments, for example, the typology of the responding user can be identified. In some embodiments, for example, the identification of the responder's typology can include, for example, determining a characteristic of the responder's response such as, for example, the content of the response, the nature of the response, the style of the response, the timing of the response, and other user activities generated as a result of the response. In some embodiments, for example, the identification of the responder's typology can include, for example, determining one or several characteristics of the user, based on the user data. This can include, for example, analyzing past responder responses to determine the content of the past responses, nature of the past responses, the timing of the past responses, and/or other user activities generated as a result of the past responses. In some embodiments, for example, the identification of the responder's typology can include determining one or several characteristics of the responder based on other aspects of the responder's user data including, for example, past outcomes achieved by the responder, personality information of the responder, and/or any other information stored in the user data. The determined characteristics of the responder can be compared to typology criteria, and, based on the results of the comparison of the determined characteristics to the typology criteria, the user typology can be identified and/or the degree to which the user exhibits a typology can be identified.

After the responder's typology has been identified, the process 300 proceeds to block 311 wherein a target outcome is identified. In some embodiments, for example, an outcome can comprise a goal. This goal can include, for example, an academic task such as, for example, a test and/or a quiz, a goal for course of study, a goal for a grouping of courses of study, a career goal, a personal goal, and/or a lifetime goal. These goals can include, for example, a grade; a degree; a career; an acceptance to, for example, a university and/or educational program; receipt of an award; development of a personality characteristic and/or attribute; and educational goal, or a career goal. In some embodiments, for example, a target outcome can be a designated goal. In some embodiments, for example, the goal can be designated by the user such as, for example, by the student and/or teacher, and in some embodiments, for example, the goal can be a default goal. Thus, a user such as a student and/or teacher may select a target outcome based on his ambition, or a target outcome may be selected by default such as, for example, enrollment in a course of study can be associated with a target outcome of a passing grade.

After the target outcome has been identified, the process 300 proceeds to decision state 312 wherein it is determined if the user will likely achieve the target outcome. In some embodiments, for example, this determination can include the evaluation of the correlation between the typology and the target outcome. In some embodiments, for example, this determination can include the comparison of the correlation between the typology exhibited by the responder to an intervention criterion. In some embodiments, for example, the intervention criteria can comprise one or several values delineating between acceptable risk and unacceptable risk as to the likelihood of a responder achieving the target outcome. In some embodiments, the risk of failing to achieve the target outcome can be represented by a risk score that can indicate the strength of correlation between the determined typology and the target outcome. In some embodiments, for example, the intervention criteria can allow sorting of responders, based on risk, into groups designated for receiving an intervention and groups designated for not receiving an intervention. In some embodiments, for example, this determination can be made by a component of the education network-based intervention system 100 such as, for example, the processor 102 and/or one or more of the user devices 106 or a component thereof such as, for example, typology engine 202 and/or the outcome engine 208.

If it is determined that the responder risk of achieving the target outcome is unacceptable, then the process 300 proceeds to block 314 wherein an intervention is requested. In some embodiments, for example, the intervention can include providing the responder with a notification of the risk relating to the target outcome, providing another user with a notification of the risk relating to the target outcome and identifying the responder, providing the responder and/or another user with the remedial plan for mitigating the risk associated with the target outcome, recommending additional and/or supplemental content, recommending a peer tutor and/or instructor, automatic assessment to determine state of knowledge, and/or any other desired action. In some embodiments, for example, the intervention can be requested by a component of the education network-based intervention system 100 such as, for example, the processor 102 and/or one or more of the user devices 106 or components thereof.

After the intervention has been requested, and returning again to decision state 312, if it is determined that the risk of achieving the target outcome is acceptable, the process 300 proceeds to block 316 wherein the responder information is updated. In some embodiments, for example, the responder information can be updated in the user database 104-A. In some embodiments, this update can reflect the determination made in decision state 312, the responder typology identified in decision state 310, and the risk level associated with the typology and achieving the target outcome.

Figure 4:
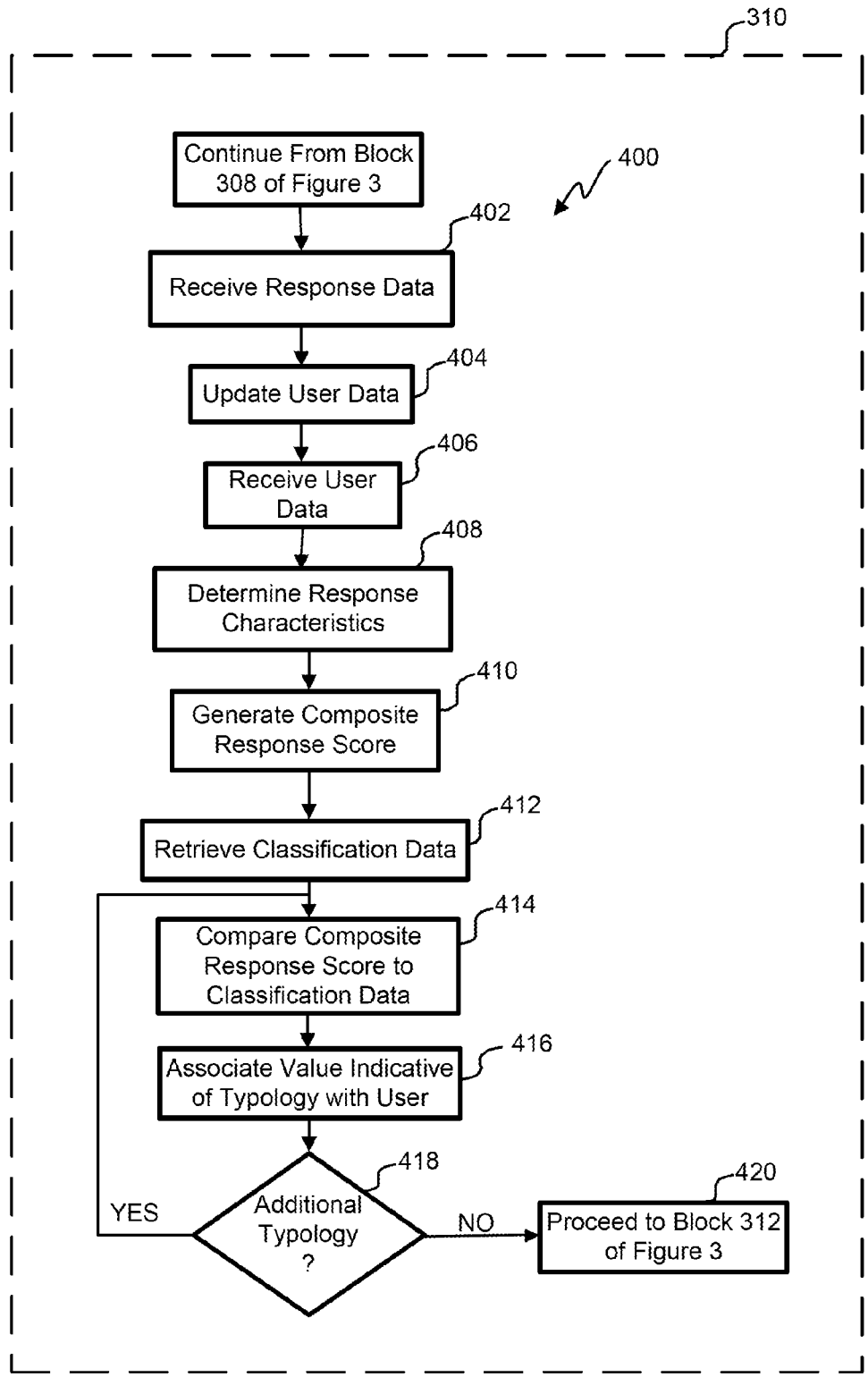
FIG. 4 is a flowchart illustrating one embodiment of a process for identifying a typology.

With reference now to FIG. 4, a flowchart illustrating one embodiment of a process 400 for identifying a typology is shown. The process 400 can be performed as part of step 310 as shown in FIG. 3. In some embodiments, the process 400 can be performed by the education network-based intervention system 100 and/or one or several components thereof.

The process 400 begins at block 402 wherein response data is received. In some embodiments, the response data can include a response received in block 308 of FIG. 3, and in some embodiments, the response data can include the received response as well as data relating to past responses. In some embodiments, the response data can be retrieved from one of the databases 104 such as, for example, the user database 104-A.

After the response data has been received, the process 400 proceeds to block 404 wherein user data is updated. In some embodiments, the user data can be updated with a value indicating that the response data has been received and/or retrieved. In some embodiments, this update can facilitate efficient evaluation of response data for one or several users. In some embodiments, the user data can be updated in one of the databases 104 such as, for example, the user database 104-A.

After the user data has been updated, the process 400 proceeds to block 406 wherein user data is received. In some embodiments, the user data can be received from one of the databases 104 such as, for example, the user database 104-A. After the user data has been the received, the process 400 proceeds to block 408 wherein response characteristics of the user are determined. In some embodiments, the determination of the response characteristics can comprise evaluating the response data. In some embodiments, this can include determining the time the response was made; the content of the response; the style, nature, and/or tone of the response; or the like. In some embodiments, the determination of the response characteristics can be performed with text mining software operating on either the processor 102 or one or several of the user devices 106.

After the response characteristics have been determined, the process 400 proceeds to block 410 wherein a composite response score is generated. In some embodiments, the composite response score can comprise one or several scores that identify characteristics of the response and/or of the user data. In some embodiments, a unique score can be assigned to each characteristic of the response and/or of the user data, and in some embodiments, the score can represent a conglomeration of multiple characteristics. In some embodiments, the score can indicate the presence of a characteristic such as, for example, a score generated according to a Boolean function wherein a first value is assigned if the response demonstrates the presence of the characteristic and wherein a second value is assigned if the response does not demonstrate the presence of the characteristic. In some embodiments, the score can indicate the degree to which a characteristic is present. In some embodiments, the composite response score can be generated by the processor 102 and/or one or several of the user devices.

After the composite response score has been generated, the process 400 proceeds to block 412 wherein classification data is retrieved. The classification data can comprise one or several parameters, equations, and/or values that can be used to identify a typology based on one or several response scores. In some embodiments, classification data can be stored in one of the databases 104 such as, for example, the typology database 104-D.

After the classification data has been retrieved, the process 400 proceeds to block 414 wherein the composite response score is compared to classification data. In some embodiments, the comparison of the composite response score to the classification data can include the use of the classification data to determine one or several user typologies based on the response data, the response score, and/or user data. The comparison of the response score to the classification data can be performed by the processor 102 and/or one or several of the user devices 106.

After the composite response score has been compared to the classification data, the process 400 proceeds to block 416 wherein a value indicative of the typology of the user is associated with the user data. In some embodiments in which one or several typologies have been identified, one or several values indicating the one or several typologies can be associated with the user data. In some embodiments, these values can indicate the presence of a typology such as, for example, a value generated according to a Boolean function wherein a first value is assigned if application of the classification data to the composite response score indicates the presence of the characteristic and wherein a second value is assigned if application of the classification data to the composite response score does not demonstrate the presence of the characteristic. In some embodiments, the score can indicate the degree to which a characteristic is present. In some embodiments, the value can be stored in one of the databases 104 such as, for example, the user database 104-A and/or the typology database 104-D.

After a value indicative of the typology of the user has been associated with the user data, the process 400 proceeds to decision state 418 wherein it is determined if the response and user data should be evaluated for additional typologies. In some embodiments, this determination can include identifying all of the typologies for which user and/or response data is evaluated and determining whether the user and/or response data has been evaluated for indication of all of the identified typologies. If it is determined that additional evaluation of the user and/or response data is desired, then the process 400 returns to block 414 and proceeds as outlined above. If it is determined that additional evaluation is not desired, then the process 400 proceeds to block 420 and continues at block 312 of FIG. 3.

Figure 5:
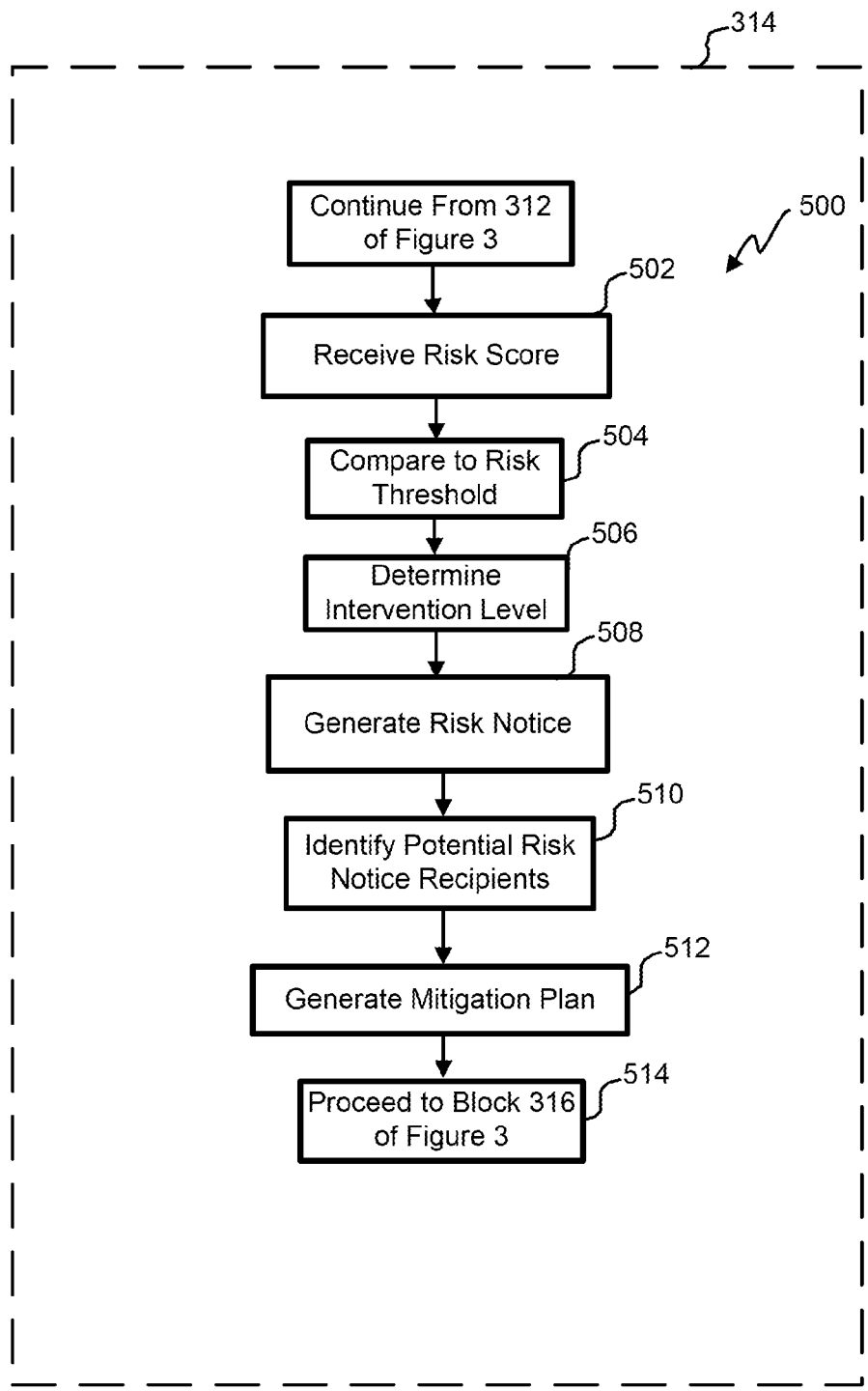
FIG. 5 is a flowchart illustrating one embodiment of a process for requesting intervention.

With reference now to FIG. 5, a flowchart illustrating one embodiment of a process 500 for requesting intervention is shown. The process 500 can be performed as part of step 314 shown in FIG. 3. In some embodiments, the process 500 can be performed by the education network-based intervention system 100 and/or one or several components thereof.

The process begins at block 502 wherein the risk score is received. In some embodiments, the risk score can represent the risk of failing to achieve the target outcome and can indicate the strength of correlation between the determined typology and the target outcome. In some embodiments, the risk score can be determined by the processor 102 and/or another component of the education network-based intervention system 100. In some embodiments, the risk score can be determined as part of decision state 312 shown in FIG. 3.

In some embodiments, the receipt of the risk score can further include receiving a risk threshold. In some embodiments, the risk threshold can define an upper limit for acceptable risk levels, and specifically, an upper limit for likelihood of failure to achieve the target outcome. The risk threshold can be any desired value and can, in some embodiments, vary, based on the target outcome. In some embodiments, the risk threshold can be specified by the user and the risk threshold can be stored in one of the databases 104 such as, for example, the user database 104-A and/or the outcome database 104-C.

After the risk score has been received, the process 500 proceeds to block 504 wherein the risk score is compared to the risk threshold. In some embodiments, this can include determining whether the risk score meets, exceeds, or fails to meet the risk threshold. In some embodiments, a value is associated with the risk score based on whether it meets, exceeds, or fails to meet the risk threshold. In one such embodiment, a first value indicative of an acceptable risk level is associated with the risk score when the risk score fails to meet or fails to exceed the risk threshold, and a second value indicative of an unacceptable risk level is associated with the risk score when the risk score meets or exceeds the risk threshold. In some embodiments, the comparison of the risk score to the risk threshold can be performed by the processor 102 or other component of the education network-based intervention system 100.

In embodiments in which the risk score exceeds the risk threshold, the comparison of the risk score to the risk threshold can include determining the degree to which the risk score exceeds the risk threshold. In some embodiments, this can be performed by comparing the risk score to a plurality of higher risk thresholds and determining which of the higher risk thresholds have been met and/or exceeded. In some embodiments, a value indicative of the degree to which the risk score exceeds the risk threshold can be associated with the user and/or the user data. In some embodiments, this determination of the degree to which the risk score exceeds the risk threshold can be performed by the processor 102 and/or another component of the education network-based intervention system 100.

After the risk score has been compared to the risk threshold, the process 500 proceeds to block 506 wherein an intervention level is determined. In some embodiments this determination of the intervention level can include retrieving information indicating the degree to which the risk score exceeds the risk threshold. In one embodiment, for example, each of the higher risk thresholds discussed above can be associated with a different intervention level. In one such embodiment, the intervention level associated with the highest risk threshold that is met and/or exceeded can be identified as appropriate for the student/user.

Advantageously, in some embodiments, as the risk of failing to achieve the target outcome increases, the level of intervention can increase to thereby mitigate the increasing risk. In one exemplary embodiment, for example, when the risk score exceeds the risk threshold to a lesser degree, a first intervention level can be attained whereas in another exemplary embodiment in which the risk score exceeds the risk threshold to a greater degree a second intervention level can be attained, and in one exemplary embodiment in which the risk score exceeds the risk threshold to an even greater degree, a third intervention level can be attained. In some embodiments, there can be any desired number of intervention levels and the intervention levels can be triggered in any desired fashion. In some embodiments, information relating to the different intervention levels can be stored in one of the databases 104 such as, for example, the course database 104-B and/or the outcome database 104-C.

After the intervention level has been determined, the process 500 proceeds to block 508 wherein a risk notice is generated. In some embodiments, the risk notice can comprise a message corresponding to the determined intervention level. In some embodiments, the risk notice can serve to notify the recipient of the risk of failing to achieve the target outcome, and in some embodiments, the risk notice can include one or several remedial and/or risk mitigating steps or actions. The risk notice can be generated by the processor 102 with information retrieved from, for example, the outcome database 104-C and/or the course database 104-B.

After the risk notice has been generated, the process 500 proceeds to block 510 wherein potential risk notice recipients are identified. In some embodiments, the identification of potential risk notice recipients can be performed by the processor 102 with data stored in one of the databases 104 such as, for example, the user database 104-A, the course database 104-B, and/or the outcome database 104-C.

After the potential risk notice recipients have been identified, the process 500 proceeds to block 512 wherein a mitigation plan is generated. In some embodiments, the mitigation plan can correspond to the identified intervention level. Thus, in some embodiments in which the first intervention level is attained, the prescribed mitigation plan may involve notifying the user/student of the risk of failure; in another exemplary embodiment in which the second intervention level is attained, the prescribed mitigation plan may involve notifying the user/student and a teacher/trainer/parent/mentor or other individual of the risk of failure; and in a third exemplary embodiment in which the third intervention level is attained, the prescribed mitigation plan may involve one or several recommended courses, materials, or actions to affect the typology of the user to thereby decrease the user's risk of failing to achieve the target outcome in addition to notifying the user/student and/or a teacher/trainer/parent/mentor or other individual of the risk of failure to achieve the target outcome. In some embodiments, information relating to the different mitigation plans is stored in one of the databases 104 such as, for example, the course database 104-B and/or the outcome database 104-C. After the mitigation plan has been generated, the process 500 proceeds to block 514 and continues at block 316 of FIG. 3.

Figure 6:
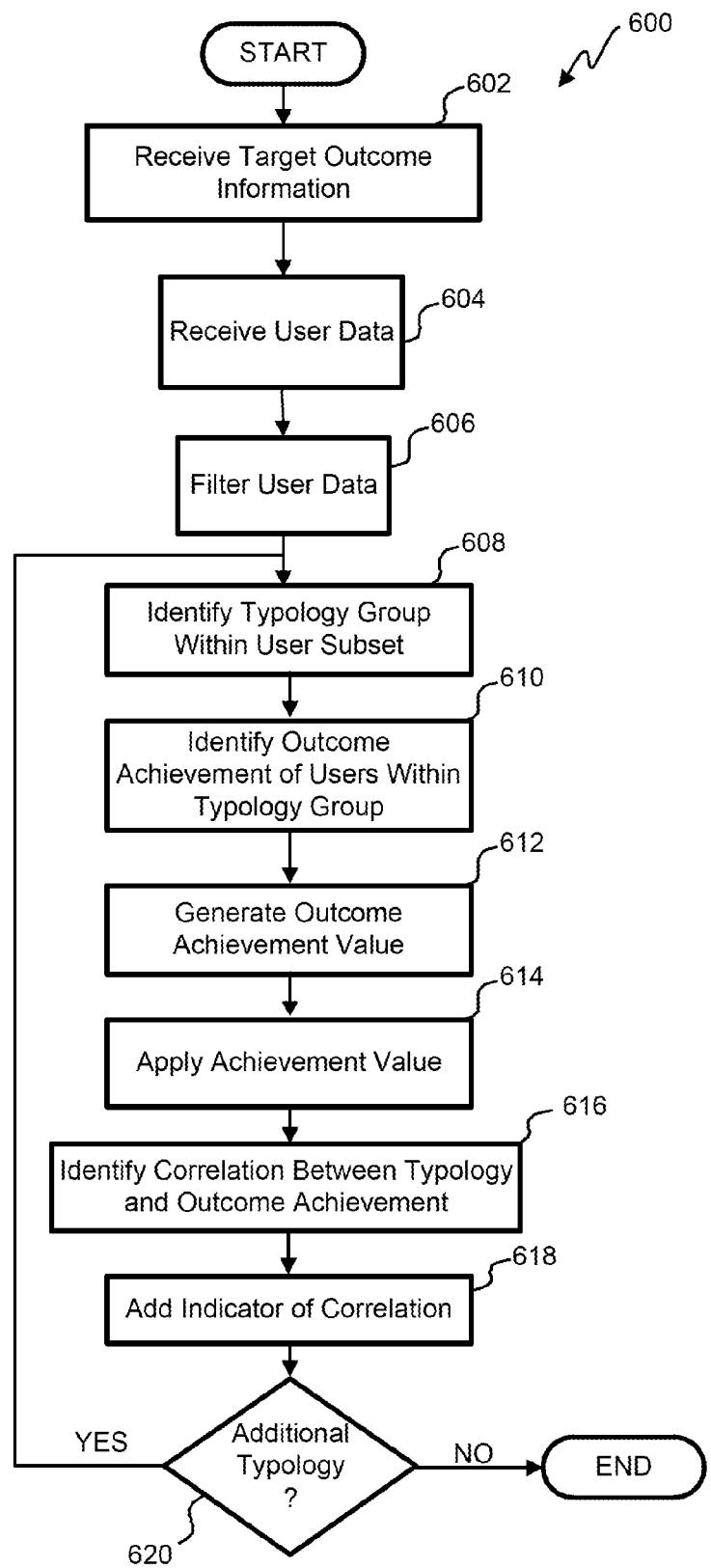
FIG. 6 is a flowchart illustrating one embodiment of a process for linking a target outcome to a typology.

With reference now to FIG. 6, a flowchart illustrating one embodiment of a process 600 for linking a target outcome to a typology is provided. The process 600 can be performed by the education network-based intervention system 100 and/or components thereof. The process 600 begins at block 602 wherein target outcome information is received. In some embodiments, for example, the target outcome information can include the identification of a goal, and can be received, for example, from one or several users via one or several user devices 106 and/or from one of the databases 104 such as, for example, the user database 104-A and/or the outcome database 104-C.

After the target outcome information has been received, the process 600 proceeds to block 604 wherein the user data is received. In some embodiments, and as discussed above in greater detail, the user data can include information relating to one or several users. This information can be received, for example, from one or several users via one or several user devices 106 and/or from the user database 104-A.

After the user data has been received, the process 600 proceeds to block 606 wherein the user data is filtered. In some embodiments, for example, the user data can be filtered to divide the user data into a first group, or user subset, related to the target outcome and the second group that is unrelated to target outcome. In some embodiments, for example, the first group that is related to the target outcome can be related to the target outcome in that members of the first group have, to some degree, achieved the target outcome and/or have taken steps towards achieving the target outcome. This filtering can be performed, for example, by a component of the education network-based intervention system 100 such as, for example, the processor 102 and/or one or several of the user devices 106 or components thereof including, for example, the outcome engine 208.

After the user data has been filtered, the process 600 proceeds to block 608 wherein a typology group within the user subset is identified. In some embodiments, for example, the typology group within the user subset can comprise a group of users within the subset of users related to the target outcome that exhibits a typology and/or exhibits at least a certain degree of the typology. In some embodiments, for example, this identification can include first analyzing user data associated with individual users to determine the typology and/or typologies of the individual users, and then identifying typology groupings of users. This identification can be performed, for example, by the processor 102 and/by or one or several of the user devices 106 or components thereof.

After the typology group within the user subset has been identified, the process 600 proceeds to block 610 wherein the outcome achievement of the users within the typology group is identified. In some embodiments, for example, this can include the binary determination of whether the users within the typology have achieved the outcome, or non-binary determination of the degree to which the users within the typology group have achieved the outcome. The identification of the outcome achievement of the users can be performed by, for example, processor 102 and/or one or several of the user devices 106 or components thereof.

After the outcome achievement of users within the typology group has been identified, the process 600 proceeds to block 612 wherein an outcome achievement value is generated. In some embodiments, for example, the outcome achievement value can indicate whether the user achieved the target outcome and/or indicate the degree to which the user has achieved the target outcome. In some embodiments, the achievement value can be generated according to a Boolean function, wherein a first value is generated if the target outcome is achieved, and a second value is generated if the target outcome is not achieved. In some embodiments, the achievement value can be generated by, for example, the processor 102 and/or one or several of the user devices 106 or components thereof.

After the outcome achievement value has been generated, the process 600 proceeds to block 614 wherein the achievement value is applied. In some embodiments, for example, the outcome achievement value can be applied to the user from whose user data the outcome achievement value was generated. In some embodiments, the application of the achievement value can include the storing of the achievement value in one of the databases 106 such as user database 104-A and or the outcome database 104-C.

After the achievement value has been applied, the process 600 proceeds to block 616 wherein the correlation between the typology and outcome achievement is identified. This correlation between the typology and outcome achievement can comprise correlative evidence and/or other evidence of an inferred relationship. In some embodiments, the generation of the correlation can include use of a statistical method of evaluation and/or a stochastic process, and in some embodiments, this may include other measures of causality including, for example, one or several discrete probabilities that can be derived through other techniques such as, for example, information-theoretic mechanisms. In some embodiments, for example, this can include the generating of correlation value for the users within the typology group. In some embodiments, for example, this can include generating a correlation value for the entire typology group and/or the correlation value for one or several portions of the typology group. In some embodiments, for example, it may be advantageous to generate a correlation value for a subset of the typology group exhibiting a certain degree and/or a range of degrees of the typology. In some embodiments, the correlation value can be generated by a component of the education network-based intervention system 100 such as the processor 102 and/or one or several of the user devices 106 or components thereof.

After the correlation between the typology and outcome achievement is identified, the process 600 proceeds to block 618 wherein an indication of the correlation is added. In some embodiments, for example, an indication of the correlation can be added to one or more of the databases 104 such as, for example, the outcome database 104-C and/or the typology database 104-D.

After an indicator of the correlation is added, the process 600 proceeds to decision state 620 wherein it is determined if there is an additional typology represented in the filtered user data. In some embodiments, for example, the filtered user data can include users having multiple typologies and/or exhibiting degrees of multiple typologies. In some embodiments, for example, it may be advantageous to determine the correlation between outcome achievement and one, some, or all of the typologies exhibited within the filtered user data. Thus, it can be advantageous to perform the steps outlined in blocks 608 to 618 for multiple typologies contained within the filtered user data.

In some embodiments, for example, the determination of whether there is an additional typology represented in the filtered user data can include evaluating the filtered user data for indications of the additional typologies. This can be performed by, for example, the processor 102 and/or one or several of the user devices 106 or components thereof. If it is determined that there are additional typologies exhibited within the filtered user data, the process 600 returns to block 608. If it is determined that there are no additional typologies within the filtered user data, then the process can, for example, terminate.

Figure 7:
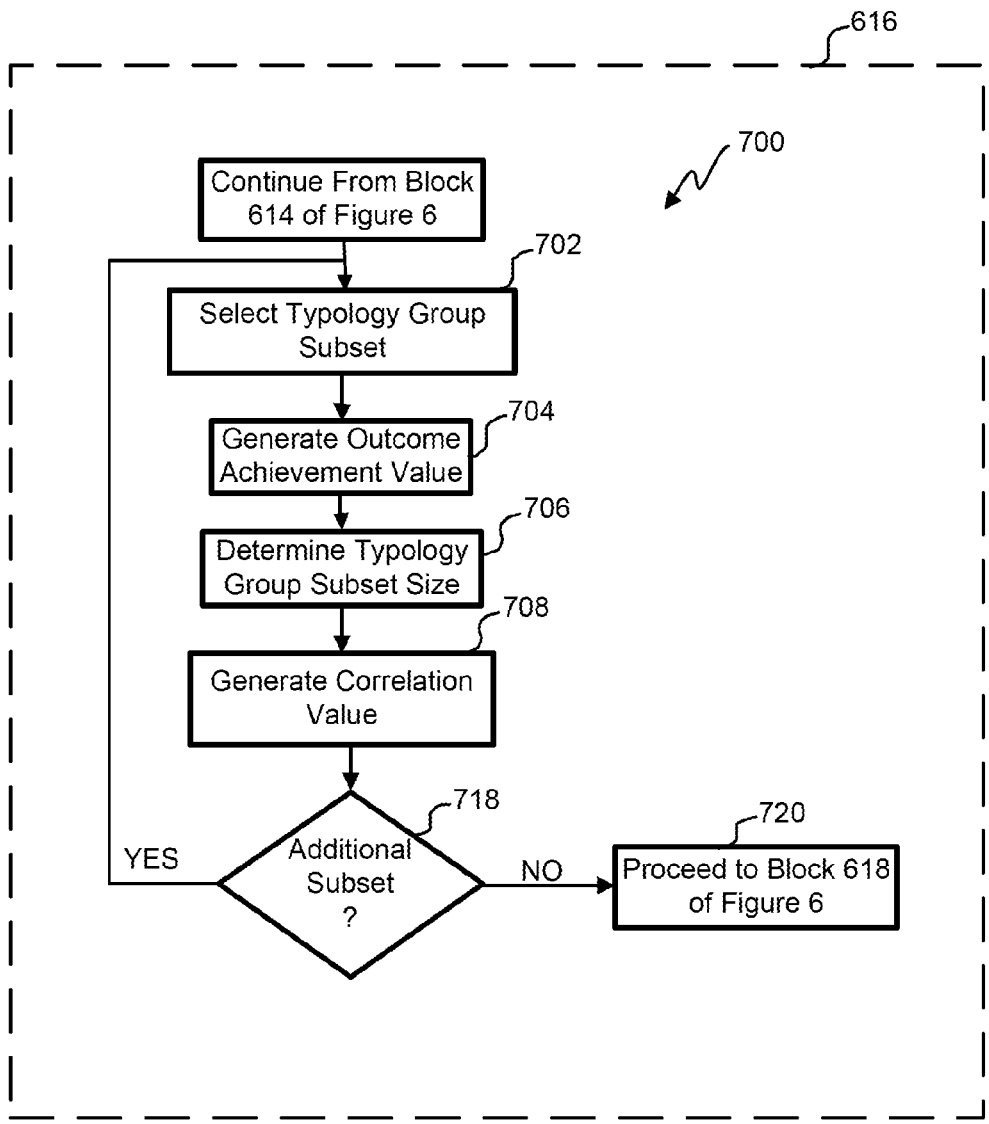
FIG. 7 is a flowchart illustrating one embodiment of a process for identifying a correlation between typology and outcome achievement.

With reference now to FIG. 7, a flowchart illustrating one embodiment of a process 700 for identifying a correlation between typology and outcome achievement is shown. The process 700 can be performed as part of step 616 as shown in FIG. 6. In some embodiments, the process 700 can be performed by the education network-based intervention system 100 and/or one or several components thereof.

The process 700 begins at block 702 wherein a typology group subset is selected. In some embodiments, the typology group subset can be all or a portion of the users identified within the typology group. In some embodiments, the typology group subset can be users exhibiting one or several desired typologies and/or one or several desired degrees of one or several desired typologies. In some embodiments, the typology group subset can be the same as the typology group identified in block 608 of FIG. 6, and in some embodiments, the typology group subset can be different from the typology group identified in block 608 of FIG. 6. In embodiments in which the typology group subset is different in the typology group identified in block 608 of FIG. 6, the typology group subset can comprise users having a desired composition of multiple typologies. In some embodiments, the typology group subset can be identified based on user data received from, for example, the user database 104-A and this identification can be performed by the processor 102 and/or another component of the education network-based intervention system 100.

After the typology group subset has been identified, the process 700 proceeds to block 704 wherein an outcome achievement value is identified. In some embodiments, the outcome achievement value can indicate whether some or all of the users within the typology group subset have attained and/or are attaining the target outcome and/or the degree to which some or all of the users within the typology group subset have attained and/or are attaining the target outcome. In some embodiments, the outcome achievement value can be generated by the processor 102 and/or another component of the education network-based intervention system 100.

After the outcome achievement value has been generated, the process 700 proceeds to block 706 wherein the typology group subset size is determined. In some embodiments, this can include determining the number of users within the typology group subset. This determination can be made by the processor 102 or another component of the education network-based intervention system 100 such as, for example, one or several of the user devices 106. After the typology group subset size has been determined, the process 700 proceeds to block 708 wherein a correlation value is generated. In some embodiments, the correlation value can indicate the correlation between the one or several typologies expressed in the typology group subset and achievement of the target outcome. In some embodiments, the correlation value can be calculated using any desired statistical or stochastic method and can be calculated by the processor 102 or other component of the education network-based intervention system 100.

After the correlation value has been generated, the process 700 proceeds to decision state 718 wherein it is determined if there is an additional typology group subset to be evaluated. In some embodiments, this can include determining whether all of a group of desired typologies have been evaluated to generate a correlation value for those desired typologies. If one of the group of desired typologies has not been evaluated to generate a correlation value, then the process 700 returns to block 702 and proceeds as outlined above. If it is determined that no additional typologies should be evaluated to generate a correlation value, then the process 700 proceeds to block 720 and returns to block 618 of FIG. 6.

Figure 8:
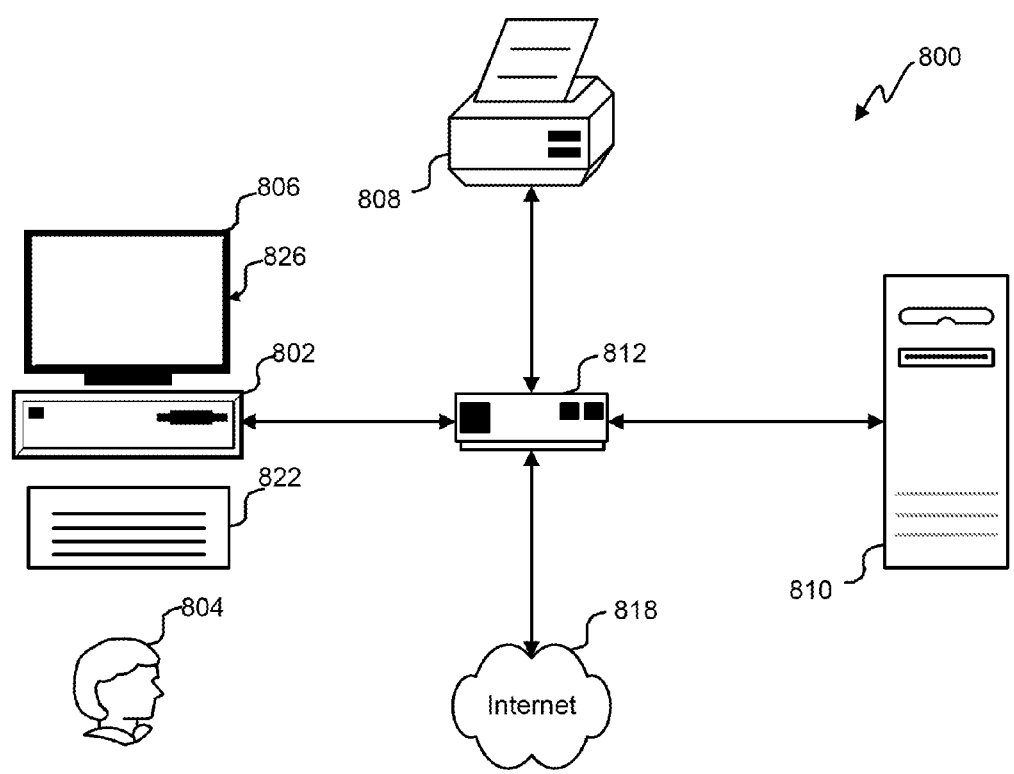
FIG. 8 is a block diagram illustrating one embodiment of a computer system.

With reference now to FIG. 8, an exemplary environment with which embodiments may be implemented is shown with a computer system 800 that can be used by a user 804 as all or a component of a program optimization system 100. The computer system 800 can include a computer 802, keyboard 822, a network router 812, a printer 808, and a monitor 806. The monitor 806, processor 802 and keyboard 822 are part of a computer system 826, which can be a laptop computer, desktop computer, handheld computer, mainframe computer, etc. The monitor 806 can be a CRT, flat screen, etc.

A user 804 can input commands into the computer 802 using various input devices, such as a mouse, keyboard 822, track ball, touch screen, etc. If the computer system 800 comprises a mainframe, a designer 804 can access the computer 802 using, for example, a terminal or terminal interface. Additionally, the computer system 826 may be connected to a printer 808 and a server 810 using a network router 812, which may connect to the Internet 818 or a WAN.

The server 810 may, for example, be used to store additional software programs and data. In one embodiment, software implementing the systems and methods described herein can be stored on a storage medium in the server 810. Thus, the software can be run from the storage medium in the server 810. In another embodiment, software implementing the systems and methods described herein can be stored on a storage medium in the computer 802. Thus, the software can be run from the storage medium in the computer system 826. Therefore, in this embodiment, the software can be used whether or not computer 802 is connected to network router 812. Printer 808 may be connected directly to computer 802, in which case, the computer system 826 can print whether or not it is connected to network router 812.

Figure 9:
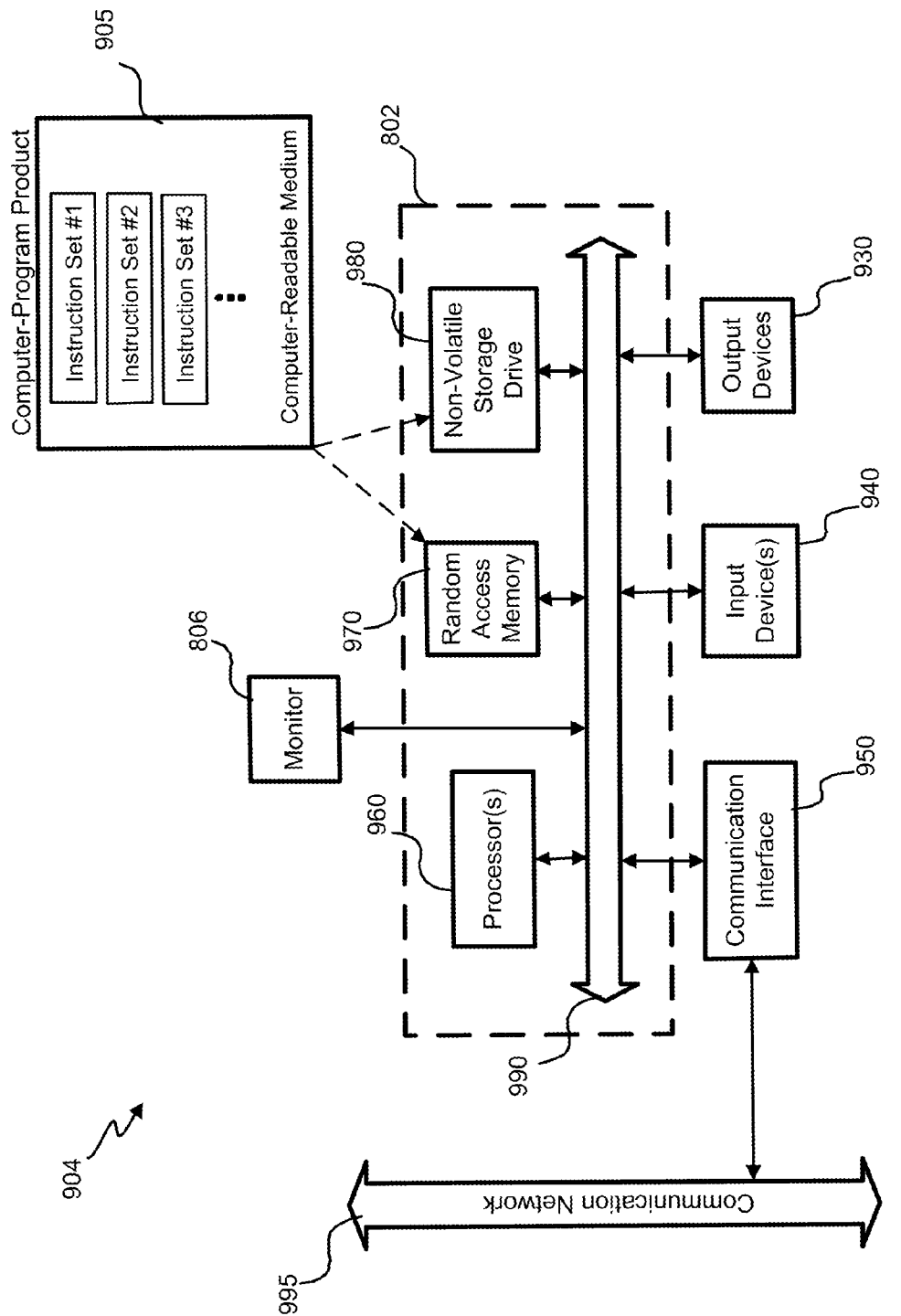
FIG. 9 is a block diagram illustrating one embodiment of a special-purpose computer.

With reference to FIG. 9, an embodiment of a special-purpose computer system 904 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 826, it is transformed into the special-purpose computer system 904.

Special-purpose computer system 904 comprises a computer 802, a monitor 806 coupled to computer 802, one or more additional user output devices 930 (optional) coupled to computer 802, one or more user input devices 940 (e.g., keyboard, mouse, track ball, touch screen) coupled to computer 802, an optional communications interface 950 coupled to computer 802, a computer-program product 905 stored in a tangible computer-readable memory in computer 802. Computer-program product 905 directs system 904 to perform the above-described methods. Computer 802 may include one or more processors 960 that communicate with a number of peripheral devices via a bus subsystem 990. These peripheral devices may include user output device(s) 930, user input device(s) 940, communications interface 950, and a storage subsystem, such as random access memory (RAM) 970 and non-volatile storage drive 980 (e.g., disk drive, optical drive, solid state drive), which are forms of tangible computer-readable memory.

Computer-program product 905 may be stored in non-volatile storage drive 980 or another computer-readable medium accessible to computer 802 and loaded into memory 970. Each processor 960 may comprise a microprocessor, such as a microprocessor from Intel® or Advanced Micro Devices, Inc.®, or the like. To support computer-program product 905, the computer 802 runs an operating system that handles the communications of product 905 with the above-noted components, as well as the communications between the above-noted components in support of the computer-program product 905. Exemplary operating systems include Windows® or the like from Microsoft® Corporation, Solaris® from Oracle®, LINUX, UNIX, and the like.

User input devices 940 include all possible types of devices and mechanisms to input information to computer system 802. These may include a keyboard, a keypad, a mouse, a scanner, a digital drawing pad, a touch screen incorporated into the display, audio input devices such as voice recognition systems, microphones, and other types of input devices. In various embodiments, user input devices 940 are typically embodied as a computer mouse, a trackball, a track pad, a joystick, wireless remote, a drawing tablet, a voice command system. User input devices 940 typically allow a user to select objects, icons, text and the like that appear on the monitor 806 via a command such as a click of a button or the like. User output devices 930 include all possible types of devices and mechanisms to output information from computer 802. These may include a display (e.g., monitor 806), printers, non-visual displays such as audio output devices, etc.

Communications interface 950 provides an interface to other communication networks 995 and devices and may serve as an interface to receive data from and transmit data to other systems, WANs and/or the Internet 818. Embodiments of communications interface 950 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 950 may be coupled to a computer network, to a FireWire® bus, or the like. In other embodiments, communications interface 950 may be physically integrated on the motherboard of computer 802, and/or may be a software program, or the like.

RAM 970 and non-volatile storage drive 980 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 970 and non-volatile storage drive 980 may be configured to store the basic programming and data constructs that provide the functionality of various embodiments of the present invention, as described above.

Software instruction sets that provide the functionality of the present invention may be stored in RAM 970 and non-volatile storage drive 980. These instruction sets or code may be executed by the processor(s) 960. RAM 970 and non-volatile storage drive 980 may also provide a repository to store data and data structures used in accordance with the present invention. RAM 970 and non-volatile storage drive 980 may include a number of memories including a main random access memory (RAM) to store of instructions and data during program execution and a read-only memory (ROM) in which fixed instructions are stored. RAM 970 and non-volatile storage drive 980 may include a file storage subsystem providing persistent (non-volatile) storage of program and/or data files. RAM 970 and non-volatile storage drive 980 may also include removable storage systems, such as removable flash memory.

Bus subsystem 990 provides a mechanism to allow the various components and subsystems of computer 802 communicate with each other as intended. Although bus subsystem 990 is shown schematically as a single bus, alternative embodiments of the bus subsystem may utilize multiple busses or communication paths within the computer 802.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for social network-based educational intervention, the system comprising:
    memory comprising:
        target group information, wherein the target group information identifies a target group comprising intended recipients of a subject prompt; and
        member information identifying attributes of the member of the target group, wherein the attributes include information relating to the member's past responses and information relating to the member's past outcomes;
    a first set of user devices communicatingly connected with a processor via a network, wherein the first set of user devices are configured to receive user data from a user and provide the user data to the processor;
    a first user device communicatingly connected to the processor via the network, wherein the first user device is configured to provide a subject prompt, wherein the subject prompt comprises information relating to a topic;

a second set of user devices, together forming a target group; and a processor configured to:

automatically identify a target outcome, wherein the target outcome comprises a goal;

continuously receive user data from the first set of user devices, wherein some of the user devices forming the first set of user devices are associated with users outside of the target group, wherein the user data comprises information generated from user interaction with the processor via the several user devices and past outcomes associated with those interactions;

automatically identify a subset of users within the user data that are relevant to the target outcome, wherein the subset of users comprises a plurality of users;

automatically associate an indicator with the user data associated with the subset of users relevant to the target outcome, wherein the indicator is associated with user data stored in the user database;

automatically identify a typology of one or several users within the subset of users relevant to the target outcome, wherein the typology is based on information relating to the user's interaction via the social network and past user outcomes;

automatically determine a correlation between the identified typology and the target outcome, wherein the correlation indicates whether the typology positively or negatively correlates with the achievement of the target outcome;

automatically add an indication of the correlation to an outcome database;

receive the subject prompt;

receive the target group information;

receive a response from a user device in the target group, wherein the response is related to the subject prompt;

automatically receive the member information;

automatically identify a typology of the member, wherein the typology identifies one or several academic and non-academic characteristics of the user, wherein the typology is based on the member information, personality information, the received response, and user activity generated as a result of the response;

automatically identify a member outcome, wherein the member outcome is an identified goal, wherein the goal is a non-academic goal;

automatically determine whether the identified typology positively correlates to achievement of the member outcome based on the determined correlation between the identified typology and the target outcome;

automatically generate an intervention when the identified typology does not positively correlate to achievement of the member outcome, wherein generating the intervention comprises generating a mitigation plan with the processor; and automatically send the intervention to a second user device and to a third user device, wherein the user of the second user device is the responding member of the target group, and wherein the user of the third user device is a teacher of the course of study, wherein the intervention activates the user interface of each of the second user device and the third user device to cause the user interface to display the mitigation plan to the user of the second user device and the user of the third user device.

2. The system of claim 1, wherein the typology of the member identifies a trait of the member.

3. The system of claim 1, wherein identifying the typology of the member comprises determining a characteristic of the received response.

4. The system of claim 3, wherein identifying the typology of the member comprises generating a composite response score, wherein the composite response score is one or several values indicative of one or several attributes of the response.

5. The system of claim 4, wherein the attributes of the response comprise at least one of:

the response content;

the response style; and the response timing.

6. The system of claim 4, wherein identifying the typology of the member comprises retrieving classification data, wherein the classification data correlates one or several composite response scores with one or several typologies, and comparing the response score to the classification data to determine the typology of the member.

7. The system of claim 1, wherein determining whether the identified typology positively correlates to achievement of the user outcome comprises calculating a risk score indicative of the risk that the member fails to achieve the member outcome.

8. The system of claim 7, wherein requesting an intervention comprises generating a mitigation plan comprising steps to increase the likelihood of member attainment of the member outcome.

* * * * *